(12) United States Patent
Vinogradov et al.

(10) Patent No.: US 8,777,105 B2
(45) Date of Patent: Jul. 15, 2014

(54) IMAGING READER WITH ASYMMETRICAL MAGNIFICATION

(75) Inventors: Igor Vinogradov, Oakdale, NY (US); Michael Veksland, Mt Laurel, NJ (US); Heng Zhang, Selden, NY (US)

(73) Assignee: Symbol Technologies, Inc., Holtsville, NY (US)

(*) Notice: Subject to any disclaimer, the term of this patent is extended or adjusted under 35 U.S.C. 154(b) by 574 days.

(21) Appl. No.: 12/582,954

(22) Filed: Oct. 21, 2009

(65) Prior Publication Data

US 2011/0089240 A1  Apr. 21, 2011

(51) Int. Cl.
G06K 7/10 (2006.01)

(52) U.S. Cl.
USPC ............... 235/454; 235/462.01; 235/462.32; 235/462.43

(58) Field of Classification Search
USPC ............... 235/454, 462.01, 462.14, 462.25, 235/462.32, 462.43
See application file for complete search history.

(56) References Cited

U.S. PATENT DOCUMENTS

| 4,794,239 | A | | 12/1988 | Allais | |
| 5,200,597 | A | * | 4/1993 | Eastman et al. | 235/455 |
| 5,304,786 | A | | 4/1994 | Pavlidis et al. | |
| 5,396,054 | A | * | 3/1995 | Krichever et al. | 235/462.1 |
| 6,912,300 | B1 | * | 6/2005 | Okamoto et al. | 382/127 |
| 7,191,947 | B2 | | 3/2007 | Kahn et al. | |
| 2002/0139856 | A1 | * | 10/2002 | Barkan | 235/462.4 |
| 2005/0053113 | A1 | * | 3/2005 | Clary et al. | 372/108 |
| 2005/0179962 | A1 | * | 8/2005 | Williamson | 358/473 |
| 2006/0016892 | A1 | * | 1/2006 | Vinogradov et al. | 235/454 |
| 2009/0084856 | A1 | * | 4/2009 | Vinogradov et al. | 235/462.41 |
| 2009/0272807 | A1 | * | 11/2009 | Vinogradov | 235/462.01 |

FOREIGN PATENT DOCUMENTS

EP 1045327 A2 10/2000
WO 2009042492 A1 4/2009

OTHER PUBLICATIONS

International Search Report and Written Opinion for International Application No. PCT/US2010/049990 mailed on Jan. 27, 2011.
International Preliminary Report on Patentability and Written Opinion for counterpart International Application No. PCT/1182010/049990 mailed on May 3, 2012.

* cited by examiner

Primary Examiner — Thien M Le
Assistant Examiner — April Taylor
(74) Attorney, Agent, or Firm — Nong-Qiang Fan

(57) ABSTRACT

A solid-state imager is mounted in a reader, such as a bi-optical, dual window, point-of-transaction workstation, for capturing light along an optical axis over a field of view from coded indicia. An optical assembly including non-rotationally symmetrical optics is operative for optically modifying and asymmetrically magnifying an image of the indicia and the field of view of the imager along mutually orthogonal directions generally perpendicular to the optical axis, and for increasing resolution of the imager along one of the directions. Preferably, the non-rotationally symmetrical optics includes a cylindrical lens having an aspherical profile along the one direction, and a planar profile along the other of the directions.

18 Claims, 3 Drawing Sheets

SQUARE PIXEL

SYMMETRICAL MAGNIFICATION

ASYMMETRICALLY SCALED RECTANGULAR PIXEL

ASYMMETRICAL MAGNIFICATION

IMAGING READER WITH ASYMMETRICAL MAGNIFICATION

BACKGROUND OF THE INVENTION

A dual window or bi-optical, point-of-transaction workstation of the type disclosed in U.S. Pat. No. 7,191,947 has been used to electro-optically read one-dimensional bar code symbols, each having a row of bars and spaces spaced apart along one direction, particularly of the Universal Product Code (UPC) type, stacked symbols such as Code 49 that introduced the concept of vertically stacking a plurality of rows of bar and space patterns in a single symbol as described in U.S. Pat. No. 4,794,239, two-dimensional symbols such as PDF417 that increased the amount of data that could be represented or stored on a given amount of surface area as described in U.S. Pat. No. 5,304,786, on products in supermarkets, warehouse clubs, department stores, and other kinds of retailers for many years. A single, horizontal window is set flush with, and built into, a horizontal countertop of the workstation. A generally upright window is oriented generally perpendicularly to the horizontal window, or is slightly rearwardly or forwardly inclined relative to the countertop, and faces an operator at the workstation.

Behind each window is an electro-optical reader, e.g., a laser scan pattern generator that projects a scan pattern of scan lines through the respective window and detects light returning from the symbol through the window, or a solid-state imager that has a one- or two-dimensional sensor array of pixels, cells or photosensors that capture light returning from the symbol through the respective window. The photosensors correspond to image elements or pixels in the field of view (FOV) of the imager. Such an imager may include a one- or two-dimensional charge coupled device (CCD) or a complementary metal oxide semiconductor (CMOS) device, as well as imaging optics and associated circuits for producing electronic signals corresponding to the one- or two-dimensional array of pixel information over the field of view.

The operator slides the products bearing the symbols past either window from right to left, or from left to right, or in another direction, in a "swipe" mode. Alternatively, the operator merely presents the symbols on the products to a central region of either window in a "presentation" mode. The choice depends on operator preference or on the layout of the workstation. Each symbol may be located low or high, or right to left, on the product, or anywhere in between, or on any of six sides of a box-shaped product. Each symbol may be oriented in a "picket fence" orientation in which the elongated parallel bars of the one-dimensional UPC symbol are vertical, or in a "ladder" orientation in which the symbol bars are horizontal, or at any orientation angle in between. When at least one of the scan lines from the scan pattern generator sweeps over a symbol, or when an image of the symbol is captured by the imager, the symbol is processed, decoded and read, and the product associated with the symbol is identified for further processing, e.g., price look-up or inventorying.

It is desirable to have the FOV of the imager large at a near working distance or a close proximity to either window of the workstation so that the FOV covers the entire symbol. At further working distances, it is preferred to have the FOV diverge slowly. As advantageous as the use of imagers has been, the range of working distances or ability to read symbols by the imager is limited by the imaging optics and by the number of pixels in, or resolution of, the imager. A ratio between the smallest imaged bar/space area, or module, of the symbol to the number of pixels on which the bar/space area is projected at the imager, that is, the number of pixels covered by the bar/space area, is known as "pixels per module" or PPM. When the FOV diverges rapidly, the PPM decreases rapidly too, which, in some cases, limits the capability of the imager to decode and read symbols at far working distances.

In cases when the symbol is tilted in a particular direction at a substantial imaging angle, for example, 45 degrees, to the imager, such as in the bi-optical workstation described above, the PPM is further reduced as a function of the cosine of the imaging angle due to the projection effect. Also, the tilted symbol appears to look denser than it actually is. It is desirable to increase the PPM in that particular direction to compensate for the loss of the PPM, the reduced resolution, the apparent increased density, and the decreased capability to decode and read such tilted symbols.

SUMMARY OF THE INVENTION

One feature of this invention resides, briefly stated, in a reader for, and a method of, electro-optically reading indicia, comprising a housing and at least one solid-state imager, and preferably a plurality of solid-state imagers, within the housing. Each imager is operative for capturing light from the indicia along an optical axis over a field of view. Each imager preferably comprises a two-dimensional, charge coupled device (CCD) array, preferably, but not necessarily, of sub-megapixel size, e.g., 752 pixels wide×480 pixels high, in order to reduce the costs of the imagers, as compared to supermegapixel arrays. Each imager includes an illuminator for illuminating the indicia with illumination light from illumination light sources, e.g., light emitting diodes (LEDs). A controller is operative for controlling each illuminator to illuminate the indicia, for controlling each imager to capture the illumination light returning from the indicia over an exposure time period to produce electrical signals indicative of the indicia being read, and for processing the electrical signals to read the indicia. Each illuminator is only operative during the exposure time period. Each imager is controlled to capture the light from the indicia during different exposure time periods to avoid mutual interference among the illuminators.

In accordance with one aspect of this invention, an optical assembly is provided in the housing, preferably including non-rotationally symmetrical optics, for optically modifying and asymmetrically magnifying an image of the indicia and the field of view of at least one of the imagers along mutually orthogonal directions generally perpendicular to the optical axis of the one imager, and for increasing resolution of the one imager along one of the directions. Thus, if the magnification is reduced along the one direction, then there will be more pixels in a given area, a higher PPM, and, as a result, the resolution of the imager will be increased along the one direction. The optical assembly with asymmetrical magnification improves the resolution of the imager, especially in those cases where the indicia being read is imaged at a steep, oblique angle. Asymmetrical magnification compensates for any loss in imager resolution due to the projection effect caused by such a steep, oblique angle.

The optical assembly includes rotationally symmetrical optics, together operative with the non-rotationally symmetrical optics, for projecting the light from the indicia onto the respective imager. The rotationally symmetrical optics advantageously includes a Cooke triplet of lenses, an aperture stop and a lens to make the Cooke triplet telecentric. In a telecentric imaging system, the chief light ray impinges on the imaging plane in a direction substantially parallel to the optical axis. The non-rotationally symmetrical optics includes one of a cylindrical lens and a toroidal lens having an aspherical profile along the one direction, and a planar profile along the other of the directions. The asymmetrical lens is preferably made of a material that filters visible light in a predetermined frequency range, e.g., red light, and corrects the asymmetrical lens for chromatic aberration of the visible light by preventing the light of a different frequency range, e.g., blue and green light, from passing through the asymmetrical lens. Alternatively, a dielectric filter can be employed for filtering visible light in the predetermined frequency range and correcting the optical assembly for chromatic aberration of the visible light by preventing the light of the different frequency range passing through the asymmetrical lens. A lens holder is employed for holding the optical assembly, and an alignment key is provided on one of the holder and the non-rotationally symmetrical optics for mutual optical alignment.

In a preferred embodiment, the housing has one window located in a generally horizontal plane, and another window located in a generally upright plane that intersects the generally horizontal plane, thereby comprising a bi-optical workstation. The imagers capture the light from the indicia through at least one of the windows, and preferably each imager has its own window. The optical axes of multiple imagers intersect, as do their fields of view. Indicia can thus be reliably read when located anywhere at a respective window, as well as within a range of working distances therefrom, and can even be tilted at steep angles relative to the windows.

In accordance with another feature of this invention, the method of electro-optically reading indicia is performed by capturing light from the indicia with a solid-state imager along an optical axis over a field of view; controlling the imager to produce an electrical signal indicative of the indicia being read, and processing the electrical signal to read the indicia; and optically modifying and asymmetrically magnifying an image of the indicia and the field of view of the imager along mutually orthogonal directions generally perpendicular to the optical axis, and increasing resolution of the imager along one of the directions, with non-rotationally symmetrical optics.

The method includes magnifying the image and the field of view differently along the mutually orthogonal directions, for example, by configuring the non-rotationally symmetrical optics with one of a cylindrical lens and a toroidal lens having an aspherical profile along the one direction, and a planar profile along the other of the directions.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 1:
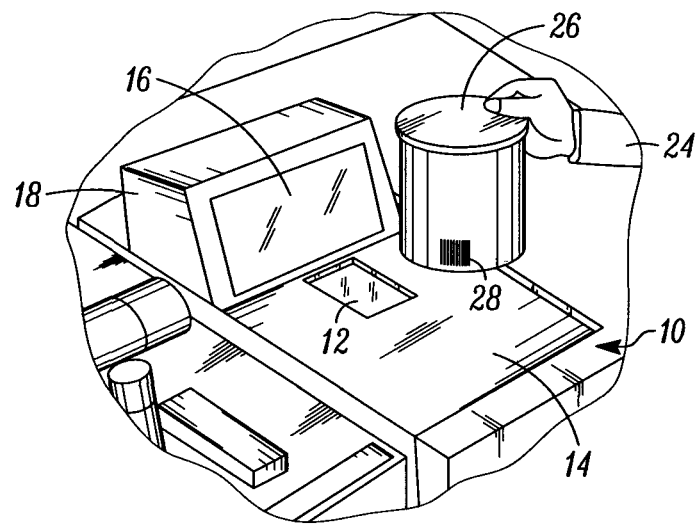
FIG. 1 is a perspective view of a dual window, bi-optical, point-of-transaction workstation or reader operative for reading indicia in accordance with this invention.

FIG. 1 depicts a dual window, bi-optical, point-of-transaction workstation 10 used by retailers to process transactions involving the purchase of products bearing an identifying target, such as the UPC symbol described above. Workstation 10 has a generally horizontal window 12 set flush with, or recessed into, a countertop 14, and a vertical or tilted (referred to as "upright" hereinafter) window 16 set flush with, or recessed into, a raised housing portion 18 above the countertop.

Figure 2:
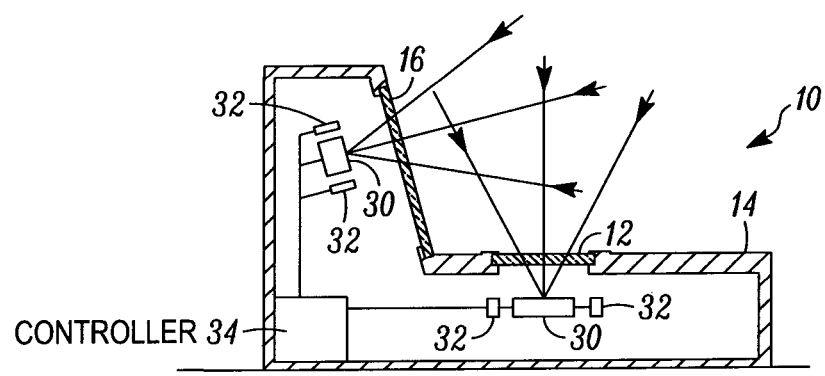
FIG. 2 is a part-sectional, part-diagrammatic, schematic view of a workstation analogous to that shown in FIG. 1.

As schematically shown in FIG. 2, a plurality of solid-state imagers 30, each including an illuminator 32, are also mounted at the workstation 10, for capturing light passing through either or both windows 12, 16 from a target that can be a one- or two-dimensional coded symbol. Each imager 30 is a solid-state area array, preferably a CCD or CMOS array, preferably of submegapixel size. Each imager 30 preferably has a global shutter, as described below. Each illuminator 32 is preferably one or more light sources, e.g., surface-mounted, light emitting diodes (LEDs), located at each imager 30 to uniformly illuminate the target, as further described below.

In use, an operator 24, such as a person working at a supermarket checkout counter, processes a product 26 bearing a UPC symbol 28 thereon, past the windows 12, 16 by swiping the product across a respective window in the abovementioned swipe mode, or by presenting the product at the respective window in the abovementioned presentation mode. The symbol 28 may located on any of the top, bottom, right, left, front and rear, sides of the product, and at least one, if not more, of the imagers 30 will capture the illumination light reflected, scattered, or otherwise returning from the symbol through one or both windows. The imagers are preferably looking through the windows at the symbol that is oriented from about zero to about 45 degrees so that the imagers can each see a side of the product that is generally perpendicular to, as well as generally parallel to, a respective window.

As also schematically shown in FIG. 2, the imagers 30 and their associated illuminators 32 are operatively connected to a programmed microprocessor or controller 34 operative for controlling the operation of these and other components. Preferably, the microprocessor is the same as the one used for decoding the return light scattered from the target and for processing the captured target images.

In operation, the microprocessor 34 sends successive command signals to the illuminators 32 to continuously energize the LEDs, or to pulse the LEDs, and successively energizes the imagers 30 to collect light from a target only during a short time period of 100 microseconds or less, also known as the exposure time period. By acquiring a target image during this brief time period, the image of the target is not excessively blurred even in the presence of relative motion between the imagers and the target.

The energization of the imagers 30 can be manual and initiated by the operator. For example, the operator can depress a button, or a foot pedal, at the workstation. The energization can also be automatic such that the imagers operate in a continuous image acquisition mode, which is the desired mode for video surveillance of the operator, as well as for decoding two-dimensional symbols. In the preferred embodiment, all the imagers will be continuously sequentially energized for scanning symbols until such time as there has been a period of inactivity that exceeds a pre-programmed time interval. For example, if no symbols have been scanned for ten minutes, then after this time period has elapsed, the reader enters a power-savings mode in which one or more of the imagers will be omitted from sequential energization. Alternatively, illumination levels may be reduced or turned off. At least one imager will remain active for periodically capturing images. If the active imager detects anything changing within its field of view, this will indicate to the operator that a product bearing a symbol is moving into the field of view, and illumination and image capture will resume to provide high performance scanning.

As previously stated, FIG. 2 is only a schematic representation of one type of imager-based reader as embodied in a bi-optical workstation. Other housings having different shapes, with one or more windows, are also within the spirit of this invention. For example, a handheld, portable reader having a gun-shaped housing is another advantageous configuration.

Each array should have a global shutter so that the captured images will not be disturbed by motion of the indicia relative to the window(s) during the exposure time period. The indicia can be presented or swiped at speeds up to around 100 inches per second across any part of either window. For an imager to be able to read an indicium that is moving rapidly, the indicium must be brightly illuminated by the illuminator 32 so that a short exposure time can be used. Bright illumination light shining out of either window can be annoying or uncomfortable to the operator, so the illumination light sources must not be directly viewable by the operator, or by a consumer standing nearby. An electronic rolling or a mechanical shutter could also be employed.

An aspect ratio of the field of view of an imager is normally the same as the aspect ratio of the sensor array. For example, if the array is 752×480 pixels, then the aspect ratio of the field of view is 752/480, or 1.56:1. A feature of this invention is that an optical assembly including non-rotationally symmetrical optics is provided in the housing, for optically modifying and asymmetrically magnifying an image of the target indicia and the field of view of the imager along mutually orthogonal directions generally perpendicular to an optical axis of the imager, to increase resolution of the imager along one of the directions. The non-rotationally symmetrical optics, as shown in FIGS. 5-8 and described in detail below, modifies the aspect ratio of the field of view of the imager.

Figure 3:
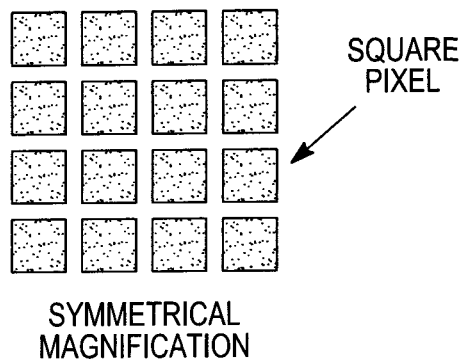
FIG. 3 is a view of representative pixels of an image in a rotationally symmetrical field of view in accordance with the prior art.

In the prior art, an imager is normally associated with an optical system, such as a convex imaging lens, having a rotationally symmetrical magnification around the optical axis. In other words, the magnification along a horizontal axis is the same, or nearly the same due to optical distortion by the imaging lens, as along a vertical axis, as considered in a plane perpendicular to the optical axis. Magnification may vary with field angle, and an imaged symbol may appear with slightly different sizes if imaged on the optical axis versus off the optical axis. FIG. 3 depicts a 4×4 grid of square pixels of an image in which the magnification along the horizontal axis is the same, or nearly so, as the magnification along the vertical axis.

Figure 4:
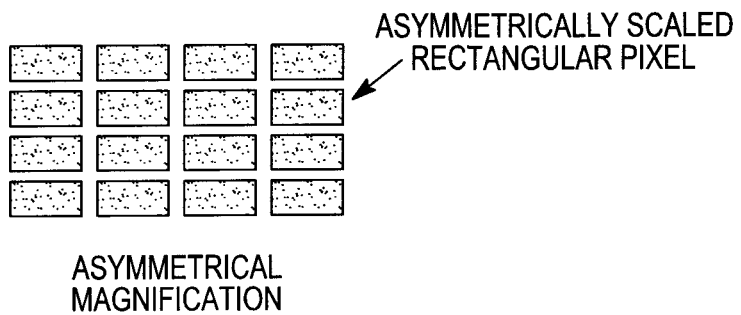
FIG. 4 is a view similar to FIG. 3 but with the field of view modified by asymmetrical magnification in accordance with this invention.

By contrast, an optical assembly with asymmetrical magnification, as shown in FIG. 4, has different magnifications along the horizontal and vertical axes. The rectangular pixels of the image appear stretched out along the horizontal axis or compressed along the vertical axis. The optical assembly with asymmetrical magnification improves the resolution of the imager, especially in those cases where the indicia is tilted with respect to the optical axis of the imager as in the case where the indicia is flat against the generally horizontal window or against the generally vertical window, or the indicia is on a surface that is generally perpendicular to either window. The modified field of view of the imager increases resolution along the 480 pixel axis (in the preferred embodiment), as compared to what it would have been if the field of view was unmodified.

Figure 5:
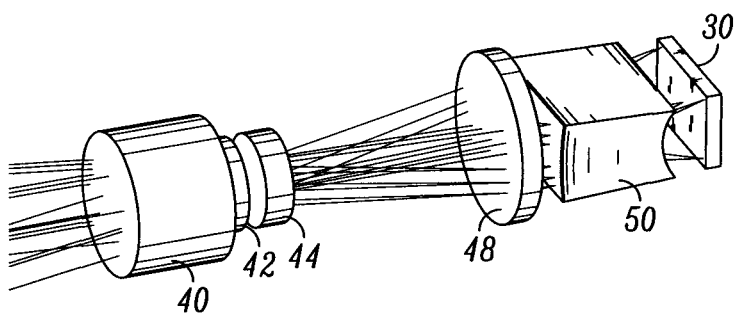
FIG. 5 is a perspective view of a sensor array of the imager and an optical assembly including both rotationally symmetrical optics and non-rotationally symmetrical optics for asymmetrically modifying an image of the indicia and the field of view of the imager in accordance with this invention.
Figure 6:
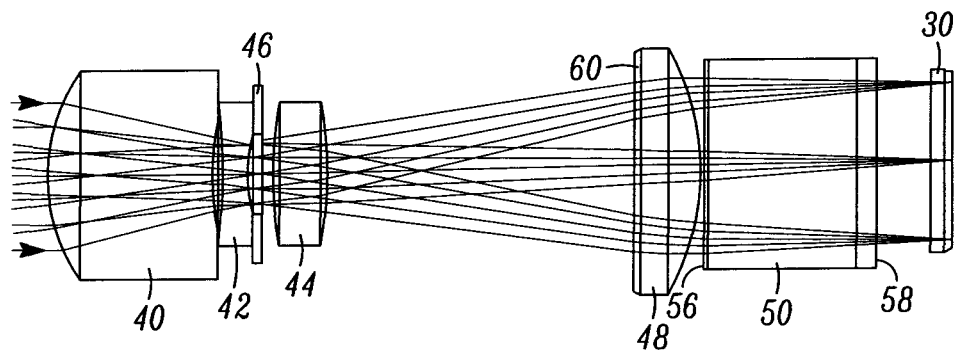
FIG. 6 is a top view of the sensor array and the optical assembly of FIG. 5 depicting light rays in a horizontal plane.
Figure 7:
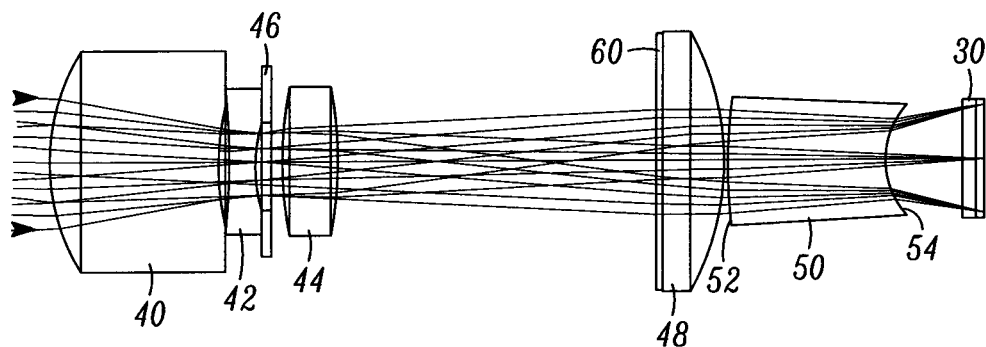
FIG. 7 is a side view of the sensor array and the optical assembly of FIG. 5 depicting light rays in a vertical plane.

FIGS. 5-7 depict a sensor array of a respective imager 30 and an optical assembly that includes rotationally symmetrical optics 40, 42, 44, 46, 48 and non-rotationally symmetrical optics 50, together operative for projecting the light from the indicia onto the sensor array of the respective imager 30. The rotationally symmetrical optics advantageously includes a Cooke triplet of lenses 40, 42, 44, an aperture stop 46 and a lens 48 operative to modify the Cooke triplet to be telecentric. The aperture stop 46 has been omitted from FIG. 5 for clarity. The non-rotationally symmetrical optics includes one of a cylindrical lens 50 and a toroidal lens having an aspherical profile 52, 54 (see FIG. 7) along the one direction, and a planar profile 56, 58 (see FIG. 6) along the other of the directions. Each lens 40, 42, 44, or 48 is preferably made of a glass material, which provides good thermal stability of the focal point relative to the imager 30 over a wide range of temperatures.

The Cooke triplet delivers the major optical power to the lens 48. The first lens 40 has a positive optical power. Both front and back surfaces of the first lens 40 are spherical, although one of them can be planar. The first lens 40 is preferably made of a crown glass with a high Abbe value. The second lens 42 has a negative optical power. Both front and back surfaces of the second lens 42 are spherical, although one of them can be planar. The second lens 42 is preferably made of a flint glass with a low Abbe value. This combination of lenses 40, 42 with crown and flint glass allows minimizing for any chromatic aberration. The third lens 44 has a positive optical power. Both front and back surfaces of the third lens 44 are spherical, although one of them can be planar. The third lens 44 is preferably made of a crown glass with a high Abbe value.

The aperture stop 46 is located inside the Cooke triplet preferably between the second lens 42 and the third 44 lens, but it can also be located between the first lens 40 and the second lens 42. The aperture is preferably rotationally symmetrical, e.g., circular, but can also be rectangular or elliptical. The aperture size and its shape determine the f-number of the optical assembly in the horizontal and vertical directions. In general, in an anamorphic system, the f-numbers of the optical assembly in the horizontal and vertical directions are different. It will be understood that this invention is not intended to be limited to using a Cooke triplet as a base lens, since more or less than three lenses could be employed to yield a desired imaging quality.

The fourth lens 48 is used to make the system nearly telecentric in the horizontal plane. As one can see from FIGS. 6-7, the chief light ray after passing through the fourth lens 48 is substantially parallel to the optical axis in both the horizontal and vertical planes. The fourth lens 48 manages the light rays to insure that the cylindrical lens 50 is able to deliver the anamorphic magnification and a desired image quality to the sensor array of the imager 30.

The fifth or asymmetrical lens 50 is non-rotationally symmetrical. The asymmetrical lens 50 is cylindrical with an aspherical surface of both the front profile or surface 52 and the back profile or surface 54 along the vertical direction. The profiles or surfaces 56, 58 are planar along the horizontal direction and, hence, there is no optical power along the horizontal direction. The asymmetrical lens 50 is preferably made of a crown plastic material such as a cyclo-olefin polymer, e.g., Zeonex (trademark) or a cyclo-olefin copolymer, e.g., Topas (trademark). In a preferred embodiment, the front profile 52, 56 has a positive power in the vertical plane, and little or no power in the horizontal plane. The back profile 54, 58, which is adjacent to the sensor array of the imager 30, has a negative power in the vertical plane, and little or no power in the horizontal plane. The asymmetrical lens 50 could also have a toroidal shape, but that involves a more complicated manufacturing process.

The optical elements 40, 42, 44, 46, 48 deliver acceptable optical quality with symmetrical magnification when the cylindrical lens 50 is not yet in place. This feature allows pretesting of the optical assembly for optical quality without installing the cylindrical lens 50, which further improves the manufacturing process and production yield.

The optical assembly of this invention elongates the image and the FOV along the horizontal direction relative to the vertical direction. Thus, if a square grid (see FIG. 3) is imaged on the sensor array of the imager 30, it will appear as a rectangular grid (see FIG. 4). Typically the difference in magnification along the horizontal and vertical directions is about 1.1-2 times.

Since the plastic material of the asymmetrical lens 50 introduces chromatic aberrations, this invention preferably makes the asymmetrical lens 50 out of a red plastic material to enable red light to pass therethrough, thereby correcting the problem of inherited chromatic aberration due to green light and blue light. The selection of color of the plastic material for the asymmetrical lens 50 is determined by the type of illumination which is used in the system. For example, if the wavelength of the illuminator 32 is around 625 nm, then the color of the plastic material should be orange so that preferably it does not attenuate any useful light.

As an alternative solution, a dielectric filter could be integrated into the optical assembly to filter out a desired wavelength. A multilayer dielectric coating 60 can be applied over a cover glass on the sensor array of the imager 30, or to a surface of one of the glass lenses 40, 42, 44, or 48 in the assembly, preferably to a surface having a large radius of curvature. A planar surface is preferred. As best shown in FIGS. 6-7, the dielectric coating 60 is applied to the front planar surface of the lens 48 since it has the largest radius of curvature.

Figure 8:
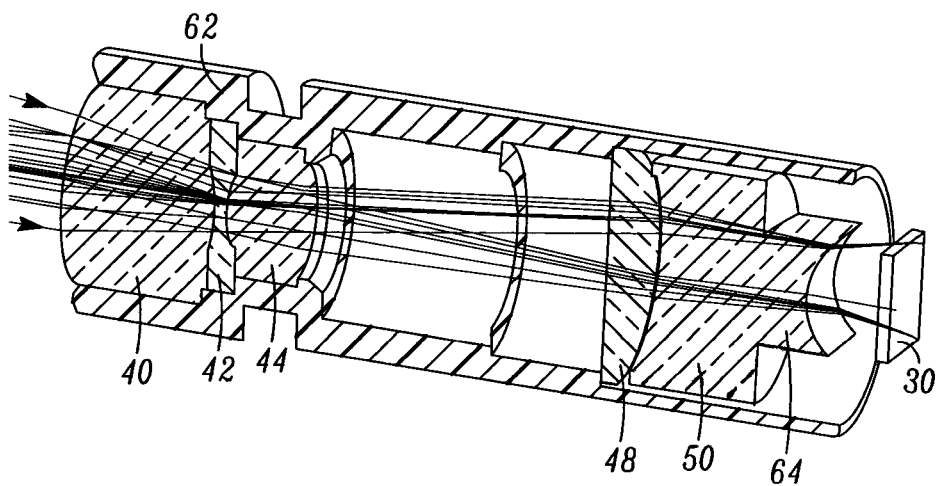
FIG. 8 is a cut-away perspective view of an optical assembly analogous to that of FIG. 5 mounted in a lens holder in optical and mechanical alignment with each sensor array in the workstation of FIG. 1.

In the preferred embodiment, as best shown in FIG. 8, the rotationally symmetrical elements 40, 42, 44, 46 and 48 are relatively easy to mount in mutual angular alignment in a rotationally symmetrical holder 62 during manufacturing. The aperture stop 46 has been omitted from FIG. 8 for clarity. The asymmetrical lens 50 has a rotationally symmetrical outside diameter. However, since the back profile 54, 58 of the asymmetrical lens 50 adjacent to the sensor array of the imager 30 needs to be accurately angularly aligned with the sensor array and the other optical elements, the lens 50 is formed with a narrowed neck or mechanical key 64 for aligning the lens 50 on the holder 62. A spacer/shoulder is preferably integrated with the lens 50 adjacent to the surface 52 to provide the correct distance between the asymmetrical lens 50 and the fourth lens 48. An alignment fixture can pick up the key 64 to orient the entire optical system relative to the sensor or imager 30 before the holder 62 is pressed into a chassis.

It will be understood that each of the elements described above, or two or more together, also may find a useful application in other types of constructions differing from the types described above.

While the invention has been illustrated and described as embodied in a point-of transaction workstation for electro-optically reading indicia by using imagers with asymmetrical magnification, it is not intended to be limited to the details shown, since various modifications and structural changes may be made without departing in any way from the spirit of the present invention. For example, the magnification along the horizontal and vertical directions for a single imager can be reversed. The magnifications for plural imagers along one direction can be the same or different.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. A reader for electro-optically reading indicia, comprising:
   a housing;
   a solid-state imager within the housing, for capturing light along an optical axis from the indicia over a field of view;
   a controller for controlling the imager to produce an electrical signal indicative of the indicia being read, and for processing the electrical signal to read the indicia;
   an optical assembly including non-rotationally symmetrical optics for optically modifying and asymmetrically magnifying an image of the indicia and the field of view of the imager along mutually orthogonal directions generally perpendicular to the optical axis, and for increasing resolution of the imager along one of said directions;
   wherein the optical assembly includes rotationally symmetrical optics, together operative with the non-rotationally symmetrical optics, for projecting the light from the indicia onto the imager; and
   wherein the non-rotationally symmetrical optics has only one non-rotationally symmetrical optics lens positioned between the rotationally symmetrical optics and the solid-state imager, the non-rotationally symmetrical optics lens has a first surface facing the rotationally symmetrical optics and has a second surface facing the solid-state imager, with the first surface having a positive power in one of the mutually orthogonal directions and having substantially no power in the other one of the mutually orthogonal directions, and with the second surface having a negative power in said one of the mutually orthogonal directions and having substantially no power in said other one of the mutually orthogonal directions.

2. The reader of claim 1, wherein the housing has one window located in a generally horizontal plane, and another window located in a generally upright plane that intersects the generally horizontal plane, and wherein the imager captures the light from the indicia through at least one of the windows.

3. The reader of claim 2, and another solid-state imager within the housing, for capturing light along another optical axis from the indicia over another field of view through another of the windows; and wherein the optical axes intersect, and the fields of view intersect.

4. The reader of claim 3, wherein each imager has pixels lying in respective imager planes generally orthogonal to the respective optical axes, and wherein at least one of the imager planes is oriented at an acute angle with respect to the indicia.

5. The reader of claim 1, wherein the rotationally symmetrical optics includes a Cooke triplet of lenses, an aperture stop, and a lens to make the Cooke triplet telecentric.

6. The reader of claim 1, wherein the non-rotationally symmetrical optics includes one of a cylindrical lens and a toroidal lens having an aspherical profile along said one direction, and a planar profile along the other of said directions.

7. The reader of claim 6, wherein the lens is made of a material that filters visible light in a predetermined frequency range and corrects the lens for chromatic aberration of visible light in a different frequency range.

8. The reader of claim 1, wherein the optical assembly includes a dielectric filter that filters visible light in a predetermined frequency range and corrects the optical assembly for chromatic aberration of visible light in a different frequency range.

9. The reader of claim 1, and a lens holder for holding the optical assembly, and an alignment key on one of the holder and the non-rotationally symmetrical optics for mutual optical alignment.

10. An arrangement for use in electro-optically reading indicia, comprising:
a solid-state imager for capturing light along an optical axis from the indicia over a field of view;
a controller for controlling the imager to produce an electrical signal indicative of the indicia being read, and for processing the electrical signal to read the indicia;
an optical assembly including non-rotationally symmetrical optics for optically modifying and asymmetrically magnifying an image of the indicia and the field of view of the imager along mutually orthogonal directions generally perpendicular to the optical axis, and for increasing resolution of the imager along one of said directions;
wherein the optical assembly includes rotationally symmetrical optics, together operative with the non-rotationally symmetrical optics, for projecting the light from the indicia onto the imager; and
wherein the non-rotationally symmetrical optics has only one non-rotationally symmetrical optics lens positioned between the rotationally symmetrical optics and the solid-state imager, the non-rotationally symmetrical optics lens has a first surface facing the rotationally symmetrical optics and has a second surface facing the solid-state imager, with the first surface having a positive power in one of the mutually orthogonal directions and having substantially no power in the other one of the mutually orthogonal directions, and with the second surface having a negative power in said one of the mutually orthogonal directions and having substantially no power in said other one of the mutually orthogonal directions.

11. The arrangement of claim 10, wherein the non-rotationally symmetrical optics includes one of a cylindrical lens and a toroidal lens having an aspherical profile along said one direction, and a planar profile along the other of said directions.

12. A method of electro-optically reading indicia, comprising the steps of:
capturing light from the indicia with a solid-state imager along an optical axis over a field of view;
controlling the imager to produce an electrical signal indicative of the indicia being read, and processing the electrical signal to read the indicia;
optically modifying and asymmetrically magnifying an image of the indicia and the field of view of the imager along mutually orthogonal directions generally perpendicular to the optical axis, and increasing resolution of the imager along one of said directions, with non-rotationally symmetrical optics;
projecting the light from the indicia onto the imager by employing rotationally symmetrical optics together with the non-rotationally symmetrical optics; and
wherein the non-rotationally symmetrical optics has only one non-rotationally symmetrical optics lens positioned between the rotationally symmetrical optics and the solid-state imager, the non-rotationally symmetrical optics lens has a first surface facing the rotationally symmetrical optics and has a second surface facing the solid-state imager, with the first surface having a positive power in one of the mutually orthogonal directions and having substantially no power in the other one of the mutually orthogonal directions, and with the second surface having a negative power in said one of the mutually orthogonal directions and having substantially no power in said other one of the mutually orthogonal directions.

13. The method of claim 12, and configuring a housing with one window located in a generally horizontal plane, and another window located in a generally upright plane that intersects the generally horizontal plane, and wherein the capturing step is performed by capturing the light from the indicia through at least one of the windows.

14. The method of claim 12, and configuring the rotationally symmetrical optics with a Cooke triplet of lenses, an aperture stop and a lens to make the Cooke triplet telecentric.

15. The method of claim 12, and configuring the non-rotationally symmetrical optics with one of a cylindrical lens and a toroidal lens having an aspherical profile along said one direction, and a planar profile along the other of said directions.

16. The method of claim 15, and making the lens of a material that filters visible light in a predetermined frequency range and corrects the lens for chromatic aberration of visible light in a different frequency range.

17. The method of claim 12, wherein the optically modifying step is performed by including a dielectric filter that filters visible light in a predetermined frequency range and corrects for chromatic aberration of visible light in a different frequency range.

18. The method of claim 12, and aligning the non-rotationally symmetrical optics with a holder for mutual optical alignment.

* * * * *